United States Patent [19]

Babaud et al.

[11] 4,218,749

[45] Aug. 19, 1980

[54] APPARATUS AND METHOD FOR DIGITAL NOISE SYNTHESIS

[75] Inventors: Jean Babaud, Sceaux, France; R. Wendell Goodwin, Dunwoody, Ga.

[73] Assignee: Sangamo Weston, Inc., Norcross, Ga.

[21] Appl. No.: 945,163

[22] Filed: Sep. 25, 1978

[51] Int. Cl.² .............................................. G06F 7/00
[52] U.S. Cl. ...................................... 364/717; 331/78
[58] Field of Search .......................... 364/717; 331/78; 340/146.2

[56] References Cited

U.S. PATENT DOCUMENTS

| | | | |
|---|---|---|---|
| 3,163,830 | 12/1964 | Theodore et al. | 331/78 |
| 3,742,381 | 6/1973 | Hurd | 331/78 |
| 3,761,696 | 9/1973 | Russell | 364/717 |
| 3,790,768 | 2/1974 | Chevalier et al. | 364/717 |
| 3,838,259 | 9/1974 | Kortenhaus | 364/717 |
| 3,866,128 | 2/1975 | Fletcher et al. | 331/78 X |
| 3,872,472 | 3/1975 | Moschgat | 331/78 X |
| 3,875,377 | 4/1975 | Hirsch | 331/78 X |
| 3,875,528 | 4/1975 | Hirsch | 331/78 |
| 3,885,139 | 5/1975 | Hurd | 364/717 |
| 3,963,905 | 6/1976 | Gopinath et al. | 364/717 |
| 3,984,668 | 10/1976 | Zetterberg et al. | 364/717 |
| 3,986,136 | 10/1976 | Hurlburt | 331/78 |
| 3,988,667 | 10/1976 | Roth et al. | 331/78 X |

OTHER PUBLICATIONS

S. B. Matthews, "Generation of Pseudorandom Noise Having a Gaussian Spectral Density," *IEEE Trans. on Computers*, Apr. 1968, pp. 382–385.

*Primary Examiner*—Jerry Smith

[57] ABSTRACT

The disclosure is directed to an apparatus and method for generating noise having characteristics of repeatability and reproducibility. A pseudo-random bit generator is responsive to clock pulses for simultaneously generating, at each clock pulse, a plurality of parallel pseudo-random digital bits which are successive bits of a pseudo-random sequence. In particular each new plurality of parallel bits is a successive group from the same pseudo-random sequence, thereby insuring a maximum number of totally uncorrelated groups. The bits generated at each clock pulse are operated on to produce an output noise signal as a function of the plurality of pseudo-random parallel bits generated at that clock pulse. In an embodiment of the invention, the operation on the plurality of bits comprises summing the value of the bits to produce a noise signal, the noise signal exhibiting a substantially Gaussian distribution with time. In another embodiment of the invention, the operation on the plurality of bits comprises comparing a first group of the plurality of bits to a second group of the plurality of bits and generating an output signal, at each clock pulse, as a function of the comparison. The output signal thereby occurs at substantially random intervals and constitutes a substantially random distributed noise signal.

31 Claims, 6 Drawing Figures

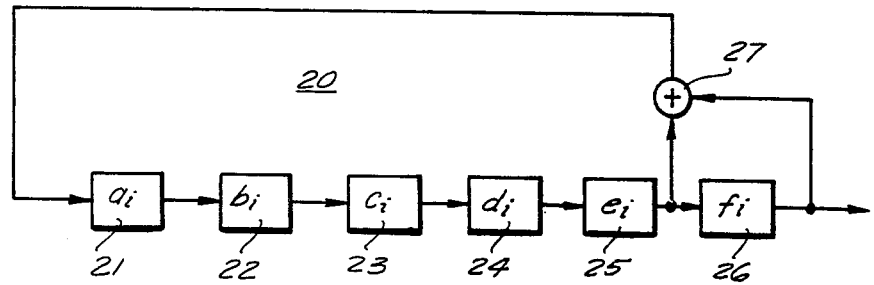

FIG. 2

| TIME \ REGISTER | 21 | 22 | 23 | 24 | 25 | 26 | OUTPUT |
|---|---|---|---|---|---|---|---|
| $i+$ | $a_i$ | $b_i$ | $c_i$ | $d_i$ | $e_i$ | $f_i$ | $f_{i-1}$ |
| $i+1$ | $e_i \oplus f_i$ | $a_i$ | $b_i$ | $c_i$ | $d_i$ | $e_i$ | $f_i$ |
| $i+2$ | $d_i \oplus e_i$ | $e_i \oplus f_i$ | $a_i$ | $b_i$ | $c_i$ | $d_i$ | $e_i$ |
| $i+3$ | $c_i \oplus d_i$ | | $e_i \oplus f_i$ | $a_i$ | $b_i$ | $c_i$ | $d_i$ |
| $i+4$ | $b_i \oplus c_i$ | | | $e_i \oplus f_i$ | $a_i$ | $b_i$ | $c_i$ |
| $i+5$ | $a_i \oplus b_i$ | | | | $e_i \oplus f_i$ | $a_i$ | $b_i$ |
| $i+6$ | | | | | | $e_i \oplus f_i$ | $a_i$ |
| $i+7$ | | | | | | | $e_i \oplus f_i$ |
| $i+8$ | | | | | | | $d_i \oplus e_i$ |
| $i+9$ | | | | | | | $c_i \oplus d_i$ |
| $i+10$ | | | | | | | $b_i \oplus c_i$ |
| $i+11$ | | | | | | | $a_i \oplus b_i$ |
| $i+12$ | | | | | | | |

FIG. 3

IN BOTH CASES, NEXT OUTPUT IS
$X_{i+1} = X_i \oplus Y_i$

TRUTH TABLE FOR BOTH

| $X_i$ | $Y_i$ | $X_{i+1}$ |
|---|---|---|
| 1 | 0 | 1 |
| 0 | 1 | 1 |
| 0 | 0 | 0 |
| 1 | 1 | 0 |

APPARATUS AND METHOD FOR DIGITAL NOISE SYNTHESIS

BACKGROUND OF THE INVENTION

This invention relates to noise generators and, more particularly, to an apparatus and method for generating pseudo-random parallel bits and for utilizing the generated bits to obtain Gaussian distributed noise and Poisson distributed noise.

Electronic noise generators have become increasingly important for generating noise that is used for various purposes, for example testing and calibration of electronic equipment, simulations, and electronic games. In testing modern electronic equipment, it is desirable to have a capability of generating noise which has a relatively wide bandwidth, has statistical properties which fall within defined limits, and is still not unduly complex or expensive. It is also desirable that the noise be repeatable and reproducible so that uniformity of test results can be expected.

Digital noise generators generally have inherent repeatability and stability. The generated digital noise may be either used directly or converted to analog noise. The bandwidth of digital noise is a function of a basic clock in the digital noise generator. The cost, complexity, and usable type of logic circuitry are often determined by the selected basic clock frequency.

A useful element of prior art digital noise generators is the so-called "pseudo-random sequence generator" or "PRSG". A pseudo-random sequence has certain properties which are similar to purely random sequences, these properties rendering pseudo-random sequences of bits (typically binary bits) quite useful. (See, for example, Golomb et al. *Digital Communications With Space Applications*, Prentice-Hall, Inc., 1974.) A typical prior art PRSG employs a string of shift register elements or stages, and the modulo-2 sum of the outputs of the last stage and of a proper choice of one or more other stages is fed back to the first stage of the string. If the shift register has x stages, a sequence of $2^x - 1$ pseudo-random bits can be generated, with the output being taken at any convenient place; e.g. the output of one of the register stages. The shift register stages are shifted using a clock and, at each clock pulse, a new pseudo-random bit of the sequence is generated at the output.

The PRSG is a useful device, but there are applications where it is necessary to have, at each specified time period, a plurality of digital bits upon which to operate. For example, it is known that a signal which has a substantially Gaussian distribution with time can be generated by summing a plurality (preferably a relatively large number) of random binary bits. This means that a number of bits must be available at each specified time period to obtain an independent sum. Accordingly, if one were to utilize the single bit output of a PRSG to obtain a Gaussian-distributed noise signal in this manner, the bits generated during a plurality of successive clock pulses would be needed to obtain each sum. This results in rendering the effective noise generator clock rate (and bandwidth) a fraction of the original basic PRSG clock rate.

In the U.S. Pat. No. 3,885,139 there is disclosed a pseudo-Gaussian noise generator which includes a plurality of multistage binary shift registers, the input to each register being the modulo-2 sum of the output of two stages from different register. Using this type of technique, a number of bits, for example the outputs of each of the registers, are available at each clock pulse. These outputs are summed to obtain the pseudo-Gaussian signal.

The referenced Patent 3,885,139 succeeds in generating a number of bits at each clock pulse but, in maintaining system bandwidth, the technique disclosed therein may sacrifice power spectral density and, to some degree, the statistical integrity of the Gaussian distribution which is desired to be produced. In particular, the referenced patent indicates that the bits obtained at each clock pulse are not consecutive bits from a pseudo-noise sequence, but rather are bits from several phase shifts of the sequence. A problem with this approach is that there is no guarantee that consecutive sums will be independent since the spacing of the sequence phase shifts from which the bits are drawn is indeterminite and thus not controllable. In other words, there is no guarantee of even a small sequence of totally uncorrelated groups, and a vanishingly small probability of getting the maximum number of totally uncorrelated groups. It is recognized that the use of bits from several phase shifts of a sequence could theoretically lead to a maximum length sequence of groups but, in practical situations, the probability is relatively small that the selected phase shifts will result in a maximum length sequence of groups. Thus, the input bits which should ideally be "random" over some desired period may actually have a degree of time correlation during that period. This is undesirable since uncorrelated input bits are necessary for both statistical and spectral integrity.

It is one of the objects of the present invention to provide a novel pseudo-random bit generator which can produce, at each clock pulse, a plurality of parallel bits which are successive bits from the same pseudo-random sequence, thereby insuring achievement of a maximum number of totally uncorrelated groups. Using this bit generator, the invention can generate noise having a binomial distribution and a $(\sin x)^2/x$ power spectral density. A further object of the invention is to provide a digital noise generator which produces Poisson or random distributed noise, and can also produce mutually uncorrelated combinations of random impulse and white noise, for example random bursts of white noise of random duration.

SUMMARY OF THE INVENTION

The present invention is directed to an apparatus and method for generating noise having characteristics of repeatability and reproducibility. In accordance with the apparatus of the invention, means are provided for generating clock pulses. A pseudo-random bit generating means is responsive to the clock pulses for simultaneously generating, at each clock pulse, a plurality of parallel pseudo-random digital bits which are successive bits of a pseudo-random sequence. In particular, each new plurality of parallel bits is a successive group from the same pseudo-random sequence. Means are then provided for operating on the bits generated at each clock pulse to produce an output noise signal as a function of the plurality of pseudo-random parallel bits generated at that clock pulse.

In an embodiment of the invention, the means for operating on the plurality of bits comprises means for summing the value of the bits to produce a noise signal, the noise signal exhibiting a substantially Gaussian distribution with time. In another embodiment of the invention, the means for operating on the plurality of bits comprises means for comparing a first group of the plurality of bits to a second group of the plurality of bits and for generating an output signal, at each clock pulse, as a function of the comparison. The output signal thereby occurs at substantially random intervals and constitutes a substantially random distributed noise signal.

In a further form of the invention, the means for operating on the plurality of bits comprises first means for summing the value of the bits to produce a first noise signal which exhibits a substantially Gaussian distribution with time, and a second means for comparing a first group of the plurality of bits to a second group of the plurality of bits to obtain a second noise signal of a random distributed type. In this embodiment, where both types of noise are produced (and are uncorrelated), further means may be provided for gating the first signal with the second signal to produce Gaussian noise bursts occurring randomly in time.

In accordance with a further aspect of the invention, there is provided a novel pseudo-random bit generator which is useful, inter alia, in the types of apparatus set forth above. In particular, there is disclosed an apparatus for simultaneously generating pluralities of parallel pseudo-random digital bits which are successive bits of the same pseudo-random sequence, thereby insuring a maximum number of totally uncorrelated groups. A plurality of bi-stable digital units, such as toggle flip-flops, are coupled together in series arrangement, and a plurality of terminals are respectively coupled to the outputs of the toggle flip-flops. A shift register element means, which may be a single shift register element, is provided for coupling one end of the string of toggle flip-flops back to the other ends thereof to form a closed loop. Clock pulses are applied to the loop and, upon application of each clock pulse, a plurality of parallel pseudo-random digital bits appear at the terminals.

Further features and advantages of the invention will become more readily apparent from the following detailed description when taken in conjunction with the accompanying drawings.

BRIEF DESCRIPTION OF THE DRAWINGS

FIG. 2 is a block diagram of a prior art pseudo-random sequence generator circuit.

FIG. 3 is a table which shows the states at various positions in the circuit of FIG. 2 at different times.

DESCRIPTION OF THE PREFERRED EMBODIMENT

Figure 1:
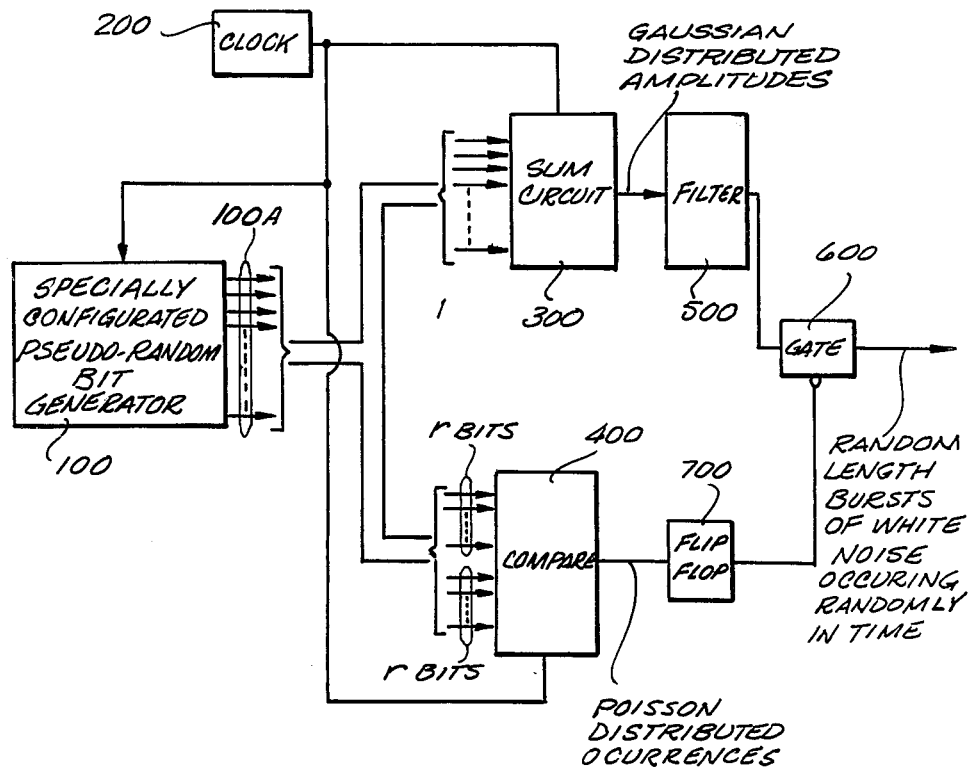
FIG. 1 is a block diagram of a noise generating apparatus in accordance with the invention.

Referring to FIG. 1, there is shown an embodiment of a digital noise synthesizing apparatus in accordance with the invention and which operates in accordance with the method of the invention. A specially configured pseudo-random bit generator 100 which constitutes an aspect of the invention, and will be described further hereinbelow, is provided. The pseudo-random bit generator 100 receives clock pulses from a clock 200 and simultaneously generates, at each clock pulse, a plurality of n parallel pseudo-random digital bits which are successive bits of the same pseudo-random sequence. These digital bits, in binary form in the present embodiment, are indicated as being produced on lines designated by the reference numeral 100A. The binary bits on lines 100A are coupled to both a summing circuit 300 and a comparator 400. The summing circuit 300 is operative, at each clock pulse, to sum the value of the binary bits on lines 100A. The output of summing circuit 300 exhibits a substantially Gaussian amplitude distribution with time, i.e. a "white noise" type of characteristic. This output is coupled to a filter 500 which is employed to remove the clock frequency from the sum signal. The output of filter 500 can be utilized directly in any desired manner, for example for testing a communications system. In the present embodiment, however, the white noise output of filter 500 is coupled to a gate 600 whose operation will be described below.

As previously noted, the digital bits on lines 100A are also coupled to a comparator 400. The comparator is operative, at each clock pulse, to compare a first group of r bits to a second group of r bits and to generate an output signal as a function of the comparison. Preferably, the comparator is operative to produce an output pulse whenever the two groups of r bits exactly correspond. The two groups, or subsets, of r bits are mutually uncorrelated, so the probability that one subset will be identical to the other is uniform in time. The output of comparator 400 is thus random in time; i.e. output occurrences are Poisson distributed. The output of comparator 400 may be utilized directly in simulating random impulse noise. In the present embodiment, though, this output is coupled to a toggle flip-flop 700 whose output is, in turn, utilized to control the gate 600. It is seen that alternate output occurrences of comparator 400 switch the output state of flip-flop 700 and turn the gate 600 on and off. Accordingly, the output of gate 600 will be random length bursts of white noise which occur randomly in time, this output being particularly useful in simulating actual noise conditions for test purposes. It can be noted that the two noise sources input to the gate 600, although derived from the same pseudo-random bits, are mutually uncorrelated.

The structure and operation of the pseudo-random bit generator can be understood by describing a simplified example of the evolution of a six bit specially configured pseudo-random bit generator. FIG. 2 shows a conventional prior art pseudo-random sequence generator 20 which includes six shift register stages, 21–26, coupled in series arrangement. The outputs of stages 25 and 26 are coupled to a modulo-2 adder (or exclusive OR gate) 27 whose output is, in turn, coupled to the input of shift register stage 21 at the beginning of the string. The output is taken from register state 26. The register states at time i are indicated as being ($a_i$, $b_i$ ... $f_i$). At each clock pulse (generated by a clock—not shown) the register shifts to the right and the modulo-2 sum of $e_i$ and $f_i$ becomes $a_{i+i}$. As is known in the art, this feedback configuration results in the generation of a pseudo-random sequence of $2^6-1$ (or 63) bits before repeating. This is a so-called "maximum-length" sequence. The output and register states, in terms of the initial states, are illustrated in the table of FIG. 3.

Figure 4:
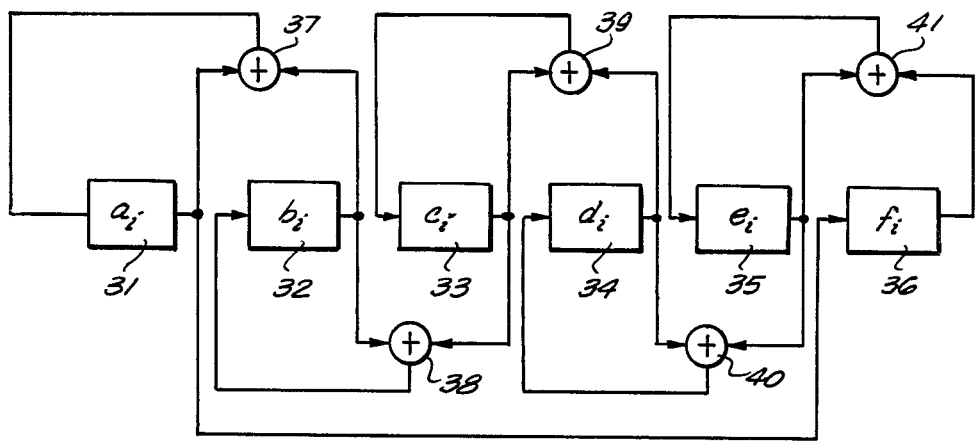
FIG. 4 shows a pseudo-random bit generator having output states which "jump ahead" by a number of steps with respect to the pseudo-random sequence generator of FIG. 2.

FIG. 4 illustrates a circuit having an output in which the states "jump ahead" (with respect to the output states of a conventional pseudo-random sequence generator—illustrated in FIG. 3) more than one step at a time. The configuration of FIG. 4 includes six shift register stages 31-36. The outputs of consecutive shift register stages are coupled to modulo-2 adders designated 37-41, with the output of each modulo-2 adder being coupled back to the shift register stage which comprises its leftmost input. Also, the output of the leftmost shift register stage 31 is coupled to the input of the rightmost register stage 36. If the initial register states are again designated as $a_i, b_i, \ldots f_i$, the expressions for the outputs of each state after the first clock pulse can be set forth as:

$$a_{i+1} = a_i \oplus b_i$$

$$b_{i+1} = b_i \oplus c_i$$

$$c_{i+1} = c_i \oplus d_i$$

$$d_{i+1} = d_i \oplus e_i$$

$$e_{i+1} = e_i \oplus f_i$$

Figure 6:
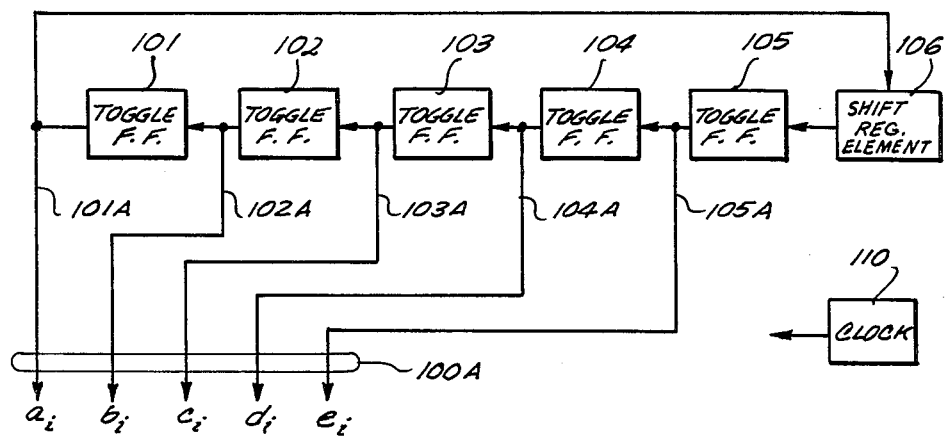
FIG. 6 is a block diagram of a pseudo-random bit generator in accordance with an embodiment of the invention.
Figure 5:
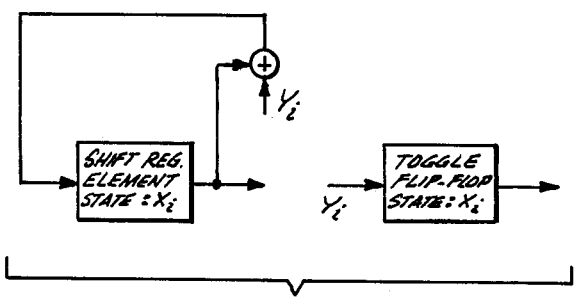
FIG. 5 illustrates the identity between a toggle flip-flop function and the units of FIG. 4.

It can be seen that these states correspond to the relationships obtained from toggle flip-flops, as illustrated by the circuits and truth table of FIG. 5. Accordingly, the circuit of FIG. 4 can be configured as shown in FIG. 6. A string of flip-flops 105, 104, 103, 102 and 101 are coupled together in series arrangement. A shift register stage or element 106 couples the output of flip-flop 101 to the input of flip-flop 105. Five parallel outputs are taken, in this case, from the outputs of flip-flops 101-105 on lines 101A through 105A, these lines being collectively referred to as lines 100A (see e.g. FIG. 1). At each pulse of the clock 110, five parallel pseudo-random binary bits appear on lines 101A through 105A. If the initial outputs are represented as $a_i, b_i \ldots e_i$, the parallel outputs at the next clock pulse are illustrated in the following table:

|  | i | i + 1 →time |
|---|---|---|
| parallel outputs | $e_i$ | $e_i \oplus f_i$ |
|  | $d_i$ | $d_i \oplus e_i$ |
|  | $c_i$ | $c_i \oplus d_i$ |
|  | $b_i$ | $b_i \oplus c_i$ |
|  | $a_i$ | $a_i \oplus b_1$ |

It can be seen that these output states are effectively a series-to-parallel conversion of groups of five bits of the pseudo-random sequence of the circuit of FIG. 2, starting at time i+2, as follows from the table of FIG. 3. At each clock pulse, the group of five parallel outputs "jumps down" to the next group of five from the original pseudo-random sequence. Accordingly, the circuit of FIG. 6 is an efficient high-speed technique for generating n (in this case five) binary random variables at each clock pulse. The implementation is preferably made with the jump size (five in this example) equal to the distance to the first feedback tap. It will be understood that the described technique can be employed to obtain as many parallel output bits as desired. As an example, the inventors constructed a 31-bit register configured to jump 28 bits at a time. In this particular model, a parallel output of 28 binary random variable was generated at a clock rate of 60 MHz using TTL logic.

The generalized theory of obtaining a Gaussian or "white noise" distribution will now be set forth. As described in conjunction with FIG. 1, the n pseudo-random bits from generator 100 are summed with equal weighting by the summing circuit 300.

The magnitude of this sum varies between o (all "0's") and n (all "1's"). The probability that the sum will be k (i.e. k "1's") at any clock period, P(k), is given by the Binomial Equation:

$$p(k) = \binom{n}{k} p^k q^{n-k} \qquad (1)$$

where p=probability of a 1.
q=probability of a 0.

$$\text{and } \binom{n}{k} = \frac{n!}{(n-k)!k!}$$

For n large, the DeMoivre-LaPlace Theorem specifies that:

$$p(k) = \binom{n}{k} p^k q^{n-k} \cong \frac{1}{\sqrt{2\pi npq}} e^{-\frac{(k-np)^2}{2npq}} \qquad (2)$$

The right hand side of equation (2) is simply a Gaussian curve whose mean $\eta = np$ and whose variance $\sigma^2 = npq$. In the present case, the probability of a "1" equals that of a zero; i.e., $p = q = \frac{1}{2}$.

$$p(k) \cong \frac{1}{\sigma\sqrt{2\pi}} e^{-\frac{(k-\eta)^2}{2\sigma^2}} \quad k = 0, 1, 2, \ldots n \qquad (3)$$

where: $\eta = n/2 = $ mean
$\sigma = \sqrt{n/4} = $ standard deviation

As the value of n is made larger, p(k) better approximates a true Gaussian distribution.

The generalized theory of obtaining the random or Poisson distributed events will now be set forth.

Impulse noise is characterized by its random occurrence in time. For a particular random distribution, the probability that a noise pulse (or short burst) will occur in any small fixed increment of time, $\Delta t$, is a constant and is independent of what happens outside $\Delta t$. (A simple example would be the flipping of a fair coin every $\Delta t$ seconds. The probability of a "head" occurring in any selected flip is a constant and is independent of the outcome of all other flips.) From ths premise, the statistics of impulse noise can be generalized.

Let p=probability of an event (e.g. an impulse of noise) in some small time $\Delta t$ and let q be the probability of no event in $\Delta t$. The probability that k events will occur in time n measured in $\Delta t$ units is $$p_k(n) = \binom{n}{k} p^k q^{n-k} \qquad (4)$$

If n gets large, the number of events, k, will approach np. This is akin to saying that if a fair coin is flipped n times, the number of heads will approach n/2. The Poisson Theorem states:

$$\lim_{n \to \infty} p_k(n) = \frac{(np)^k e^{-np}}{k!} \quad (5)$$

Let time t be measured in "n" events; therefore:

$$\lambda t = pn \quad (6)$$

where λ=the number of events per unit time. (Again, using a coin analogy as an example, flipping a fair coin at the rate of 5 flips per second for 60 seconds, with n=300 trials, λ would be (0.5)(300)/(60)=2.5 events/sec.) Substituting (6) into (5) gives:

$$p_k(t) = \frac{(\lambda t)^k e^{-\lambda t}}{k!} \quad (7)$$

Equation (7) is the probability of seeing k events in a time t, and is the basic expression for impulse noise. A useful form, since impulse noise spikes are generally many seconds apart, is the probability of seeing a time t between successive impulses.

This expression derives from Equation (5) by computing the conditional probability of seeing an impulse in the next short time assuming there were no impulses in the previous n-1 intervals:

$$\begin{aligned}p\text{ (n intervals between} \\ \text{events)} = p(n) = p_1(1)p_0(n-1) = pe^{-p} \cdot e^{-(n-1)p} \\ = pe^{-np}\end{aligned} \quad (8)$$

Since $\lambda t = pn$, $$p(t) = \lambda e^{-\lambda t} = \text{probability of seeing a time t between successive events} \quad (9)$$

(Again, using coin flips as an example with λ=2.5 events (heads)/sec, the probability of going for 2 seconds without having a head come up is $p(2) = 2.5 e^{-(2.5)(2)} = 0.017$.)

In the embodiment of FIG. 1, the generation of events at the rate of λ per second is achieved by comparing a subset of r bits of the n pseudo-random bits generator with another subset of r bits (2r≦n). An event is defined as a match and an output is then generated.

Since the two sets of r bits are independent, the probability that they will match is:

$$p_m\{\text{match}\} = 1/2^r \quad (10)$$

If the clock 200 is running at $f_c$Hz, the expected number of outputs per unit time is, from Equation (7):

$$\lambda = \frac{f_c}{2^r} e^{-\frac{f_c t}{2^r}} \quad (11)$$

A range of λ's can be obtained, if desired, by making the comparisons only at some m submultiple of the clock frequency, or by varying r.

As was noted above, a feature of the random noise generation of FIG. 1 is that the sole criterion for an event is the matching of r bits of the two subsets. The probability of a match is thus independent of the number of ones and zeros in the subsets. On the other hand, the Gaussian noise generation of FIG. 1 depends only on the number of ones and zeros in the PRBG output. Therefore, the Gaussian noise and the random impulse noise are statistically independent even though they are derived from the same source.

We claim:

1. Apparatus for generating noise having characteristics of repeatability and reproducibility, comprising:
   means for generating clock pulses;
   pseudo-random bit generating means responsive to said clock pulses for simultaneously generating at each clock pulse, a plurality of parallel uncorrelated pseudo-random digital bits which are successive groups of bits of a pseudo-random sequence; and
   means for operating on the bits generated at each clock pulse to produce an output noise signal as a function of the plurality of pseudo-random parallel bits generated at that clock pulse.

2. The noise generating apparatus as defined by claim 1 wherein said means for operating on said plurality of bits comprises means for summing the value of said bits to produce a noise signal, said noise signal exhibiting a substantially Gaussian distribution with time.

3. The noise generator as defined by claim 2 wherein said means for operating on said bits includes filter means for filtering the clock frequency from said output noise signal.

4. Apparatus as defined by claim 2 wherein said pseudo-random bit generating means comprises:
   a plurality of toggle flip-flops coupled together in series arrangement;
   a plurality of terminals respectively coupled to the outputs of said toggle flip-flops;
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

5. The noise generating apparatus as defined by claim 1 wherein said means for operating on said plurality of bits comprises means for comparing a first group of said plurality of bits to a second group of said plurality of bits and for generating an output signal, at each clock pulse, as a function of the comparison, the output signal thereby occurring at substantially random intervals and constituting a substantially random distributed noise signal.

6. The noise generator as defined in claim 5 wherein said means for operating on said bits includes filter means for filtering the clock frequency from said output noise signal.

7. Apparatus as defined by claim 5 wherein said pseudo-random bit generating means comprises:
   a plurality of toggle flip-flops coupled together in series arrangement;
   a plurality of terminals respectively coupled to the outputs of said toggle flip-flops;
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

8. The noise generating apparatus as defined by claim 1 wherein said means for operating on said plurality of bits comprises first means for summing the value of said bits to produce a first noise signal, said first noise signal exhibiting a substantially Gaussian distribution with time, and second means for comparing a first group of said plurality of bits to a second group of said plurality of bits and for generating an output signal, at each clock pulse, as a function of the comparison, the output signal thereby occurring at substantially random intervals and constituting a second noise signal; said first and second noise signals being mutually uncorrelated.

9. The noise generator apparatus as defined by claim 8 further comprising means for gating said first noise signal with said second noise signal to produce Gaussian noise bursts occurring randomly in time.

10. Apparatus as defined by claim 9 wherein said pseudo-random bit generating means comprises:
   a plurality of toggle flip-flops coupled together in series arrangement;
   a plurality of terminals respectively coupled to the outputs of said toggle flip-flops; and
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

11. Apparatus as defined in claim 8 wherein said pseudo-random bit generating means comprises:
   a plurality of toggle flip-flops coupled together in series arrangement;
   a plurality of terminals respectively coupled to the outputs of said toggle flip-flops;
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

12. The noise generator as defined by claim 1 wherein said means for operating on said bits includes filter means for filtering the clock frequency from said output noise signal.

13. Apparatus as defined by claim 1 wherein said pseudo-random bit generating means comprises:
   a plurality of toggle flip-flops coupled together in series arrangement;
   a plurality of terminals respectively coupled to the outputs of said toggle flip-flops;
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

14. Apparatus for simultaneously generating pluralities of parallel uncorrelated pseudo-random digital bits which are successive groups of bits of the same pseudo-random sequence, comprising:
   a plurality of toggle flip-flops coupled together in series arrangement;
   a plurality of terminals respectively coupled to the outputs of said toggle flip-flops;
   shift register element means for coupling one end of said series of toggle flip-flops back to the other end thereof to form a closed loop; and
   means for applying clock pulses to said loop;
   whereby upon application of each clock pulse a plurality of parallel pseudo-random digital bits appear at said terminals.

15. Apparatus as defined by claim 14 wherein said shift register element means comprises a single shift register element.

16. A method for generating noise having characteristics of repeatability and reproducibility, comprising the steps of:
   generating clock pulses;
   generating, at each clock pulse, a plurality of parallel uncorrelated psuedo-random digital bits which are successive groups of bits of a pseudo-random sequence; and
   operating on the bits generated at each clock pulse to produce an output noise signal as a function of the plurality of pseudo-random parallel bits generated at that clock pulse.

17. The method as defined by claim 16 wherein said step of operating on said plurality of bits comprises summing the value of said bits to produce a noise signal, said noise signal exhibiting a substantially Gaussian distribution with time.

18. The method as defined by claim 16 wherein said step of operating on said plurality of bits comprises comparing a first group of said plurality of bits to a second group of said plurality of bits and for generating an output signal, at each clock pulse, as a function of the comparison, the output signal thereby occurring at substantially random intervals and constituting a substantially random distributed noise signal.

19. The method as defined by claim 16 wherein said step of operating on said plurality of bits comprises the steps of summing the value of said bits to produce a first noise signal, said first noise signal exhibiting a substantially Guassian distribution with time, and comparing a first group of said plurality of bits to a second group of said plurality of bits and generating an output signal, at each clock pulse, as a function of the comparison, the output signal thereby occurring at substantially random intervals and constituting a second noise signal; said first and second noise signals being mutually uncorrelated.

20. The method as defined by claim 19 further comprising the step of gating said first noise signal with said second noise signal to produce Gaussian noise bursts occurring randomly in time.

21. The method as defined by claim 16 wherein the step of operating on said bits includes filtering the clock frequency from said output noise signal.

22. Apparatus for generating noise having characteristics of repeatability and reproducibility, comprising:
   means for generating clock pulses;
   pseudo-random bit generating means responsive to said clock pulses for simultaneously generating, at each clock pulse, a plurality of parallel pseudo-random digital bits which are successive bits of a pseudo-random sequence; and
   means for comparing a first group of said plurality of bits to a second group of said plurality of bits and for generating an output signal, at each clock pulse, as a function of the comparison, the output signal thereby occurring at substantially random intervals and constituting a substantially random distributed noise signal.

23. The noise generator as defined by claim 22 further comprising filter means for filtering the clock frequency from said output noise signal.

24. Apparatus as defined by claim 22 wherein said pseudo-random bit generating means comprises:
- a plurality of toggle flip-flops coupled together in series arrangement;
- a plurality of terminals respectively coupled to the outputs of said toggle flip-flops;
- shift register element means for coupling one end of said series of toggle flip-flops back to the other end thereof to form a closed loop; and
- means for applying clock pulses to said loop;
- whereby upon application of each clock pulse a plurality of parallel pseudo-random digital bits appear at said terminals.

25. Apparatus for generating noise having characteristics of repeatability and reproducibility, comprising:
- means for generating clock pulses;
- pseudo-random bit generating means responsive to said clock pulses for simultaneously generating, at each clock pulse, a plurality of parallel pseudo-random digital bits which are successive bits of a pseudo-random sequence;
- first means for summing the value of said plurality of bits to produce a first noise signal, said first noise signal exhibiting a substantially Gaussian distribution with time; and
- second means for comparing a first group of said plurality of bits to a second group of said plurality of bits and for generating an output signal, at each clock pulse, as a function of the comparison, the output signal thereby occurring at substantially random intervals and constituting a second noise signal;
- said first and second noise signals being mutually uncorrelated.

26. The noise generator apparatus as defined by claim 25 further comprising means for gating said first noise signal with said second noise signal to produce Gaussian noise bursts occurring randomly in time.

27. Apparatus as defined by claim 26 wherein said pseudo-random bit generating means comprises:
- a plurality of toggle flip-flops coupled together in series arrangement;
- a plurality of terminals respectively coupled to the outputs of said toggle flip-flops;
- shift register element means for coupling one end of said series of toggle flip-flops back to the other end thereof to form a closed loop; and
- means for applying clock pulses to said loop;
- whereby upon application of each clock pulse a plurality of parallel pseudo-random digital bits appear at said terminals.

28. Apparatus as defined by claim 25 wherein said pseudo-random bit generating means comprises:
- a plurality of toggle flip-flops coupled together in series arrangement;
- a plurality of terminals respectively coupled to the outputs of said toggle flip-flops;
- shift register element means for coupling one end of said series of toggle flip-flops back to the other end thereof to form a closed loop; and
- means for applying clock pulses to said loop;
- whereby upon application of each clock pulse a plurality of parallel pseudo-random digital bits appear at said terminals.

29. A method for generating noise having characteristics of repeatability and reproducibility, comprising the steps of:
- generating clock pulses;
- generating, at each clock pulse, a plurality of parallel pseudo-random digital bits which are successive bits of pseudo-random sequence; and
- comparing a first group of said plurality of bits to a second group of said plurality of bits and generating an output signal, at each clock pulse, as a function of the comparison, the output signal thereby occurring at substantially random intervals and constituting a substantially random distributed noise signal.

30. A method for generating noise having characteristics of repeatability and reproducibility, comprising the steps of:
- generating clock pulses;
- generating, at each clock pulse, a plurality of parallel pseudo-random digital bits which are successive bits of a pseudo-random sequence;
- summing the value of said bits to produce a first noise signal, said first noise signal exhibiting a substantially Guassian distribution with time; and
- comparing a first group of said plurality of bits to a second group of said plurality of bits and generating an output signal, at each clock pulse, as a function of the comparison, the output signal thereby occurring at substantially random intervals and constituting a second noise signal;
- said first and second noise signals being mutually uncorrelated.

31. The method as defined by claim 30 further comprising the step of gating said first noise signal with said second noise signal to produce Guassian noise bursts occurring randomly in time.

* * * * *

UNITED STATES PATENT AND TRADEMARK OFFICE
CERTIFICATE OF CORRECTION

PATENT NO. : 4,218,749

DATED : August 19, 1980

INVENTOR(S) : Jean Babaud et al

It is certified that error appears in the above-identified patent and that said Letters Patent are hereby corrected as shown below:

Column 1, line 67, "register" should read -- registers --.

Column 2, line 16, "indeterminite" should read -- indeterminate --.

Column 3, line 34, "ends" should read -- end --.

Column 5, in the Table, the last line "$a_i \quad a_i \oplus b_1$" should read --$a_i \quad a_i \oplus b_i$ --.

Claim 19, column 10, line 36, "Guassian" should read -- Gaussian --.

Claim 29, column 12, line 23, insert -- a -- between "of" and "pseudo-random"

Claim 30, column 12, line 40, "Guassian" should read -- Gaussian --.

Claim 31, column 12, line 51, "Guassian" should read -- Gaussian --.

Signed and Sealed this

Seventeenth Day of August 1982

[SEAL]

Attest:

GERALD J. MOSSINGHOFF

*Attesting Officer*    *Commissioner of Patents and Trademarks*